(12) United States Patent
Lee

(10) Patent No.: US 12,151,745 B2
(45) Date of Patent: Nov. 26, 2024

(54) CAB SYSTEM FOR A VEHICLE

(71) Applicant: CNH Industrial America LLC, New Holland, PA (US)

(72) Inventor: James Lee, New Holland, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 18/083,090

(22) Filed: Dec. 16, 2022

(65) Prior Publication Data
US 2024/0199144 A1 Jun. 20, 2024

Related U.S. Application Data

(63) Continuation of application No. 18/081,564, filed on Dec. 14, 2022.

(51) Int. Cl.
| | |
|---|---|
| *B62D 33/06* | (2006.01) |
| *B60K 23/02* | (2006.01) |
| *B60N 2/02* | (2006.01) |
| *B60N 2/06* | (2006.01) |
| *B60N 2/14* | (2006.01) |
| *B60N 2/39* | (2006.01) |
| *B60T 7/06* | (2006.01) |
| *B62D 1/18* | (2006.01) |
| *B62D 1/181* | (2006.01) |
| *B62D 5/04* | (2006.01) |
| *B62D 33/063* | (2006.01) |
| *B62D 33/073* | (2006.01) |

(Continued)

(52) U.S. Cl.
CPC .......... *B62D 33/0617* (2013.01); *B60K 23/02* (2013.01); *B60N 2/0224* (2013.01); *B60N 2/062* (2013.01); *B60N 2/14* (2013.01); *B60N 2/39* (2013.01); *B60T 7/06* (2013.01); *B62D 1/18* (2013.01); *B62D 1/181* (2013.01); *B62D 5/0409* (2013.01); *B62D 33/063* (2013.01); *B62D 33/073* (2013.01); *E02F 9/166* (2013.01); *B60K 2023/025* (2013.01); *B60Y 2400/42* (2013.01); *E02F 9/2012* (2013.01)

(58) Field of Classification Search
CPC ...... B62D 33/0617; B62D 1/18; B62D 1/183; B62D 5/0409; B60N 2/062
See application file for complete search history.

(56) References Cited

U.S. PATENT DOCUMENTS

| | | | | |
|---|---|---|---|---|
| 4,026,379 A | * | 5/1977 | Dunn ..................... | E02F 3/964 |
| | | | | 105/342 |
| 7,121,608 B2 | * | 10/2006 | Billger ..................... | B60N 2/38 |
| | | | | 297/344.22 |
| 9,707,865 B1 | * | 7/2017 | Buerkle ................... | B60N 2/38 |

(Continued)

FOREIGN PATENT DOCUMENTS

| | | | | |
|---|---|---|---|---|
| CA | | 1282670 C | 4/1991 | |
| CN | | 107433972 A | * 12/2017 | ............... B62D 1/04 |

(Continued)

*Primary Examiner* — Drew J Brown
(74) *Attorney, Agent, or Firm* — Rickard K. DeMille; Rebecca L. Henkel; Peter K. Zacharias

(57) ABSTRACT

Systems and apparatuses include a cab floor defining a center plane, a seat slide actuator coupled to the cab floor and selectively moveable in a direction transverse to the center plane relative to the cab floor, and a seat supported by the seat slide actuator and moveable therewith.

18 Claims, 5 Drawing Sheets

(51) Int. Cl.
*E02F 9/16* (2006.01)
*E02F 9/20* (2006.01)

(56) References Cited

U.S. PATENT DOCUMENTS

| | | | |
|---|---|---|---|
| 2013/0193729 A1* | 8/2013 | VanMiddendorp | B60N 2/0228 297/311 |
| 2017/0008475 A1* | 1/2017 | Kruse | B62D 1/18 |
| 2018/0186266 A1* | 7/2018 | Fitzpatrick | B60N 3/063 |
| 2018/0234626 A1* | 8/2018 | Ali | H04N 7/181 |
| 2018/0251073 A1* | 9/2018 | Hendron | E02F 9/166 |

FOREIGN PATENT DOCUMENTS

| | | | | | |
|---|---|---|---|---|---|
| CN | 110714393 | A | * | 1/2020 | B60T 7/02 |
| CN | 216101674 | U | * | 3/2022 | |
| DE | 19642956 | A1 | * | 4/1998 | B60K 23/00 |
| DE | 102005005511 | A1 | * | 8/2006 | B60N 2/062 |
| DE | 102010035270 | A1 | * | 3/2012 | B60N 2/062 |
| EP | 1571064 | A1 | * | 9/2005 | B60T 7/06 |
| EP | 3712035 | A2 | * | 9/2020 | B60K 26/02 |
| EP | 4039561 | A2 | * | 8/2022 | B60K 23/00 |
| GB | 2531101 | A | * | 4/2016 | B60F 3/00 |
| KR | 20170024186 | A | | 3/2017 | |
| WO | WO-9015747 | A1 | * | 12/1990 | |
| WO | WO-2005042334 | A1 | * | 5/2005 | B60N 2/163 |
| WO | WO-2006022030 | A1 | * | 3/2006 | B60N 2/06 |
| WO | WO-2007050004 | A1 | * | 5/2007 | B62D 1/18 |
| WO | WO-2012176499 | A1 | * | 12/2012 | E02F 3/964 |

* cited by examiner

CAB SYSTEM FOR A VEHICLE

CROSS-REFERENCE TO RELATED APPLICATION

The present application is a continuation of U.S. patent application Ser. No. 18/081,564, filed on Dec. 14, 2022, the contents of which are hereby incorporated by reference in their entirety.

BACKGROUND

The present disclosure relates generally to cab system for a vehicle. More specifically, the present disclosure relates to cab system that provides an ergonomic seating position for a side view position of a tractor.

SUMMARY

One embodiment relates to a cab system for a vehicle that includes a cab floor defining a center plane, a seat slide actuator coupled to the cab floor and selectively moveable in a direction transverse to the center plane relative to the cab floor, and a seat supported by the seat slide actuator and moveable therewith.

In some embodiments, the seat slide actuator is structured to move the seat in the direction transverse to the center plane between a center position and a side view position.

In some embodiments, the seat slide actuator includes a motorized actuator. In some embodiments, the motorized actuator is controlled automatically based on a preset program.

In some embodiments, the cab system further includes a wheel well coupled to the cab floor. The seat slide actuator is structured to move the seat in the direction transverse to the center plane between a center position and a side view position where the seat overlaps the wheel well.

In some embodiments, the cab system further includes a steering column defining a steering column center plane. The seat defines a seat center point, and the seat slide actuator is structured to move the seat in the direction transverse to the center plane between a center position defining an offset in the transverse direction between the seat center point and the steering column center plane of zero inches, and a side view position defining an offset in the transverse direction between the seat center point and the steering column center plane of between about ten inches and about twenty-four inches.

In some embodiments, the seat defines a seat center point. The seat slide actuator is structured to move the seat in the direction transverse to the center plane between a center position defining an offset in the transverse direction between the seat center point and the center plane of zero inches, and a side view position defining an offset in the transverse direction between the seat center point and the center plane of between about ten inches and about twenty-four inches.

In some embodiments, the cab system further includes a seat rotation actuator coupled to the seat slide actuator and supporting the seat, the seat rotation actuator structured to rotate the seat between a center position and a side view position. In some embodiments, the seat rotation actuator includes a motorized actuator. In some embodiments, the motorized actuator is controlled automatically based on a preset program. In some embodiments, the seat rotation actuator is structured to rotate the seat between about forty-five degrees and about ninety degrees relative to the center plane. In some embodiments, the seat defines a projection extending therefrom. The projection is entirely aligned with a side window of the cab system when the seat is arranged in the side view position. In some embodiments, a seat-steering angle defined between a center point of the seat and a center point of a steering column is between about thirty degrees and about sixty degrees when the seat is arranged in the side view position.

In some embodiments, the cab system further includes a seat spacing actuator supported by the seat slide actuator and supporting the seat, the seat spacing actuator structured to move the seat parallel to the center plane.

In some embodiments, the cab system further includes a seat height actuator supported by the seat slide actuator and supporting the seat, the seat height actuator structured to move the seat vertically.

Another embodiment relates to a cab system for a vehicle that includes a cab floor defining a center plane, a steering column defining a steering column center point, a seat slide actuator coupled to the cab floor and selectively moveable in a direction transverse to the center plane relative to the cab floor, a seat rotation actuator coupled to the seat slide actuator and structured to rotate relative to the seat slide actuator, and a seat supported by the seat rotation actuator and defining a seat center point. The seat is moveable between: a center position defining an offset in the transverse direction between the seat center point and the center plane of zero inches, and a seat-steering angle of zero degrees defined between the seat center point and the steering column center point, and a side view position defining an offset in the transverse direction between the seat center point and the center plane of between about ten inches and about twenty-four inches, and a seat-steering angle of between about thirty and about sixty degrees defined between the seat center point and the steering column center point.

In some embodiments, the seat defines a projection extending therefrom. The projection is entirely aligned with a side window of the cab system when the seat is arranged in the side view position.

In some embodiments, the seat rotation actuator is structured to rotate the seat between about forty-five degrees and about ninety degrees relative to the center plane.

Another embodiment relates to a cab system for a vehicle that includes a cab floor defining a center plane, a seat slide actuator coupled to the cab floor and selectively moveable in a direction transverse to the center plane relative to the cab floor, a seat supported by the seat slide actuator and moveable therewith, and a wheel well coupled to the cab floor. The seat slide actuator is structured to move the seat in the direction transverse to the center plane between a center position and a side view position where the seat overlaps the wheel well.

In some embodiments, the cab system further includes a seat height actuator supported by the seat slide actuator and supporting the seat, the seat height actuator structured to move the seat vertically above the wheel well when the seat is arranged in the side view position.

Another embodiment relates to a cab system for a vehicle that includes a cab floor defining a center plane, a seat supported by cab floor, a steering column slide actuator coupled to the cab floor and selectively moveable relative to the seat in a direction oblique to the center plane, and a steering column coupled to the steering column slide actuator.

In some embodiments, the steering column is a steer-by-wire system.

In some embodiments, the steering column slide actuator is structured to move the steering column in a direction transverse to the center plane. In some embodiments, the steering column slide actuator is structured to move the steering column in the direction transverse to the center plane between a center position and a side view position. In some embodiments, the steering column slide actuator includes a motorized actuator. In some embodiments, the motorized actuator is controlled automatically based on a preset program.

In some embodiments, the seat defines a seat center point, the steering column defines a steering column center plane, and the steering column slide actuator is structured to move the steering column in the direction transverse to the center plane between a center position defining an offset in the transverse direction between the seat center point and the steering column center plane of zero inches, and a side view position defining an offset in the transverse direction between the seat center point and the steering column center plane of between about ten inches and about twenty-four inches.

In some embodiments, the seat defines a seat center point, the steering column defines a steering column center point, and the steering column slide actuator is structured to move the steering column in the direction transverse to the center plane between: a center position defining a seat-steering angle of zero degrees defined between the seat center point and the steering column center point, and a side view position defining a seat-steering angle of between about thirty and about sixty degrees defined between the seat center point and the steering column center point.

In some embodiments, the steering column includes a steering column release pedal, a clutch pedal, a front brake pedal, and a rear brake pedal.

In some embodiments, the cab system further includes a door providing access to a cab interior, the steering column slide actuator moves the steering column away from the door.

In some embodiments, the steering column defines a steering column center plane, and the steering column slide actuator is structured to move the steering column in the direction transverse to the center plane between: a center position defining an offset in the transverse direction between the center plane and the steering column center plane of zero inches, and a side view position defining an offset in the transverse direction between the center plane and the steering column center plane of between about ten inches and about twenty-four inches.

In some embodiments, the cab system further includes a seat rotation actuator coupled to the cab floor and supporting the seat, the seat rotation actuator structured to rotate the seat between a center position and a side view position. In some embodiments, the seat rotation actuator is structured to rotate the seat between about forty-five degrees and about ninety degrees relative to the center plane. In some embodiments, the cab system further includes a seat slide actuator coupled to the cab floor and selectively moveable in a direction transverse to the center plane relative to the cab floor. In some embodiments, the cab system further includes a seat height actuator supported by the seat slide actuator and supporting the seat, the seat height actuator structured to move the seat vertically above a wheel well when the seat is arranged in the side view position.

Another embodiment relates to a cab system for a vehicle that includes a cab defining a center plane, a steering column slide actuator mounted in the cab and selectively moveable in a direction transverse to the center plane between a center position and a side view position, and a steering column coupled to the steering column slide actuator.

In some embodiments, the center position defines an offset in the transverse direction between the center plane and a steering column center plane of zero inches, and the side view position defines an offset in the transverse direction between the center plane and the steering column center plane of between about ten inches and about twenty-four inches.

In some embodiments, the cab system further includes a seat positioned in the cab and defining a seat center point, the center position defines a seat-steering angle of zero degrees defined between the seat center point and a steering column center point, and the side view position defines a seat-steering angle of between about thirty and about sixty degrees defined between the seat center point and the steering column center point.

Another embodiment relates to a cab system for a vehicle that includes a cab defining a center plane, a seat positioned in the cab and defining a seat center point, a steering column slide actuator mounted in the cab and selectively moveable in a direction transverse to the center plane between a center position and a side view position, and a steering column coupled to the steering column slide actuator. The center position defines: an offset in the transverse direction between the center plane and a steering column center plane of zero inches, and a seat-steering angle of zero degrees defined between the seat center point and a steering column center point. The side view position defines: an offset in the transverse direction between the center plane and the steering column center plane of between about ten inches and about twenty-four inches, and a seat-steering angle of between about thirty and about sixty degrees defined between the seat center point and the steering column center point.

In some embodiments, the cab system further includes a seat slide actuator mounted to the cab and selectively moveable in a direction transverse to the center plane, a seat rotation actuator supported by the seat slide actuator, supporting the seat, and structured to rotate the seat between about forty-five degrees and about ninety degrees relative to the center plane, and a seat height actuator supported by the seat slide actuator, supporting the seat, and structured to move the seat vertically above a wheel well of the cab in the side view position.

Another embodiment relates to a cab system for a vehicle that includes a steering column including a steering column clutch pedal, a remote clutch pedal spaced from the steering column clutch pedal, and a seat rotatable between a center position aligned with the steering column clutch pedal, and a side view position aligned with the remote clutch pedal.

In some embodiments, the remote clutch pedal includes a clutch by wire system.

In some embodiments, the steering column clutch pedal moves with the steering column.

In some embodiments, the seat defines a projection extending therefrom, and the remote clutch pedal is positioned within the projection when the seat is arranged in the side view position. In some embodiments, the projection is defined as a volume extending from the seat along a seat axis and bound by lateral sides of the seat. In some embodiments, the projection is entirely aligned with a side window of the cab system when the seat is arranged in the side view position. In some embodiments, the projection is at least partially aligned with a visual display of the cab system when the seat is arranged in the side view position.

In some embodiments, the cab system further includes a seat rotation actuator structured to rotate the seat between the center position and the side view position.

In some embodiments, the center position defines a seat rotation of about zero degrees relative to a center plane of the cab system, and the side view position defines a seat rotation of between about forty-five degrees and about ninety degrees relative to the center plane.

In some embodiments, the center position defines a seat-steering angle of zero degrees defined between a seat center point and a steering column center point, and the side view position defines a seat-steering angle of between about thirty and about sixty degrees defined between the seat center point and the steering column center point.

In some embodiments, the cab system further includes a seat slide actuator coupled to a cab floor, supporting the seat, and selectively moveable in a direction transverse to a center plane of the cab system. The seat slide actuator is structured to move the seat in the direction transverse to the center plane between the center position defining an offset in the transverse direction between a seat center point and a center plane of the cab system of zero inches, and the side view position defining an offset in the transverse direction between the seat center point and the center plane of between about ten inches and about twenty-four inches.

In some embodiments, the cab system further includes a seat slide actuator coupled to a cab floor, supporting the seat, and selectively moveable in a direction transverse to a center plane of the cab system. The seat slide actuator is structured to move the seat in the direction transverse to the center plane between the center position defining an offset in the transverse direction between a seat center point and a steering column center plane of zero inches, and the side view position defining an offset in the transverse direction between the seat center point and the steering column center plane of between about ten inches and about twenty-four inches.

In some embodiments, the cab system further includes a wheel well coupled to a cab floor, and a seat slide actuator coupled to the cab floor, supporting the seat, and selectively moveable in a direction transverse to a center plane of the cab system. The seat slide actuator is structured to move the seat in the direction transverse to the center plane between the center position and the side view position where the seat overlaps the wheel well. In some embodiments, the cab system further includes a seat height actuator supported by the seat slide actuator, supporting the seat, and structured to move the seat vertically above the wheel well in the side view position.

In some embodiments, the cab system further includes a steering column slide actuator supporting the steering column and selectively moveable relative to the seat in a direction oblique to a center plane of the cab system.

Another embodiment relates to a cab system for a vehicle that includes a cab floor defining a center plane, a primary clutch pedal, a secondary clutch pedal supported by the cab floor and spaced from the primary clutch pedal, and a seat rotatable between a center position aligned with center plane and the primary clutch pedal, and a side view position aligned with the secondary clutch pedal, the seat defining a projection volume extending from the seat along a seat axis and bound by lateral sides of the seat. The secondary clutch pedal is positioned within the projection volume when the seat is arranged in the side view position.

In some embodiments, the projection volume is entirely aligned with a side window of the cab system when the seat is arranged in the side view position.

In some embodiments, the projection volume is at least partially aligned with a visual display of the cab system when the seat is arranged in the side view position.

Another embodiment relates to a cab system for a vehicle that includes a cab floor defining a center plane, a steering column including a steering column clutch pedal, a remote clutch pedal spaced from the steering column clutch pedal, a seat slide actuator coupled to the cab floor and selectively moveable in a direction transverse to a center plane of the cab system between a center position and a side view position, a seat rotation actuator structured to rotate between the center position and the side view position, and a seat coupled to the seat rotation actuator and defining a projection volume extending from the seat along a seat axis and bound by lateral sides of the seat. The seat slide actuator is structured to move the seat in the direction transverse to the center plane between the center position defining an offset in the transverse direction between a seat center point and a steering column center plane of zero inches, and the side view position defining an offset in the transverse direction between the seat center point and the steering column center plane of between about ten inches and about twenty-four inches, and the remote clutch pedal is positioned within the projection volume when the seat is arranged in the side view position.

In some embodiments, the center position defines a seat-steering angle of zero degrees defined between a seat center point and a steering column center point, and the side view position defines a seat-steering angle of between about thirty and about sixty degrees defined between the seat center point and the steering column center point.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a cab system of the present disclosure provides significant improvements over existing cab systems for ergonomically providing a side viewing position. Tractors and other agricultural equipment are used to plow and plant fields for food production. Often during such operations, it is desirable for the vehicle operator to look out a side or rear window of the cab of the vehicle to watch an implement at work or to align the vehicle. Current systems require the operator to contort their body to operate the vehicle, and watch the implement or general operation out of a side or rear window. Embodiments described herein provide a vehicle with a cab system allowing for movement of a seat and/or a steering column to better align the operator for use of the vehicle during operations requiring viewing out the side or rear window.

Overall Vehicle

Figure 1:
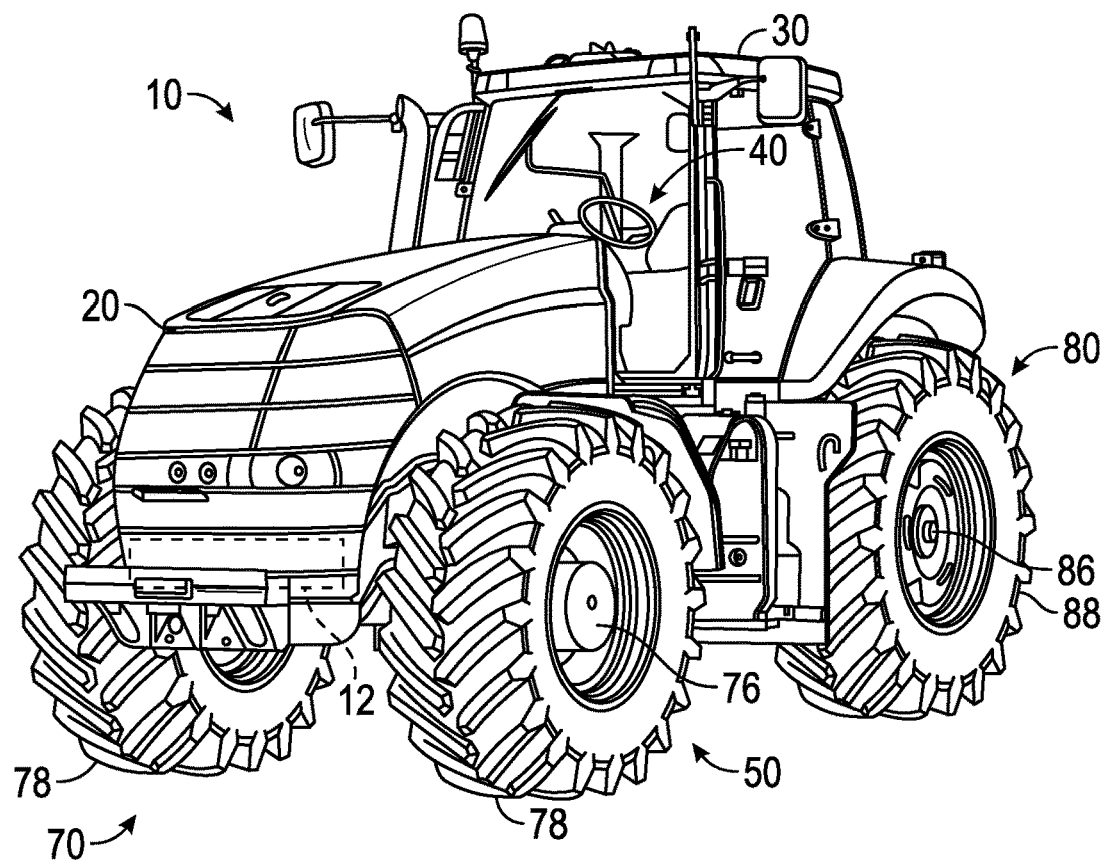
FIG. 1 is a perspective view of a vehicle, according to an exemplary embodiment.
Figure 2:
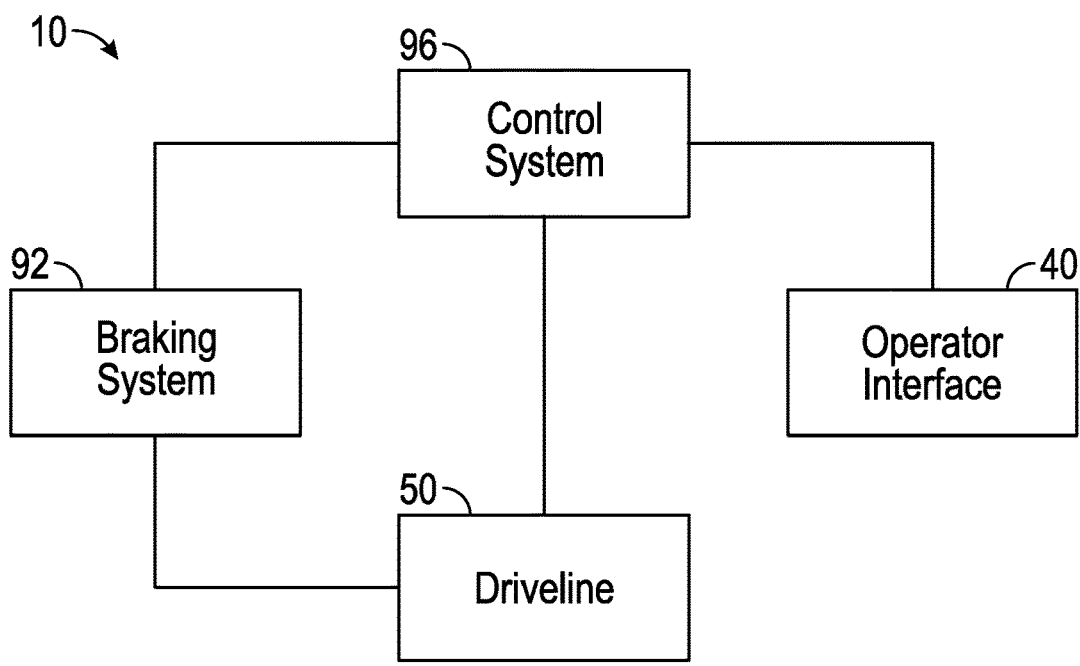
FIG. 2 is a schematic block diagram of the vehicle of FIG. 1, according to an exemplary embodiment.
Figure 3:
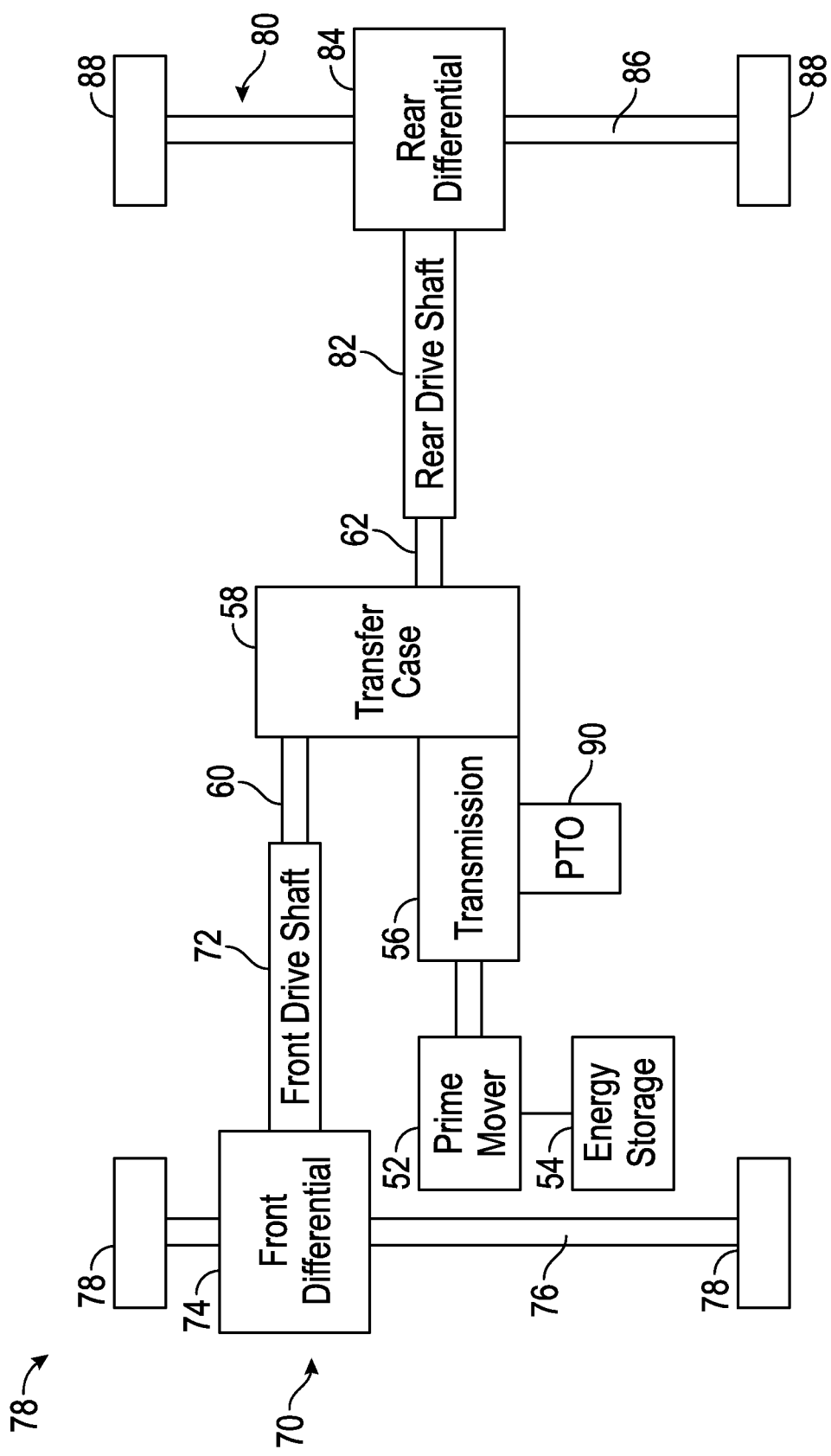
FIG. 3 is a schematic block diagram of a driveline of the vehicle of FIG. 1, according to an exemplary embodiment.

According to the exemplary embodiment shown in FIGS. 1-3, a machine or vehicle, shown as vehicle 10, includes a chassis, shown as frame 12; a body assembly, shown as body 20, coupled to the frame 12 and having an occupant portion or section, shown as cab 30; operator input and output devices, shown as operator interface 40, that are disposed within the cab 30; a drivetrain, shown as driveline 50, coupled to the frame 12 and at least partially disposed under the body 20; a vehicle braking system, shown as braking system 92, coupled to one or more components of the driveline 50 to facilitate selectively braking the one or more components of the driveline 50; and a vehicle control system, shown as control system 96, coupled to the operator interface 40, the driveline 50, and the braking system 92. In other embodiments, the vehicle 10 includes more or fewer components.

The chassis of the vehicle 10 may include a structural frame (e.g., the frame 12) formed from one or more frame members coupled to one another (e.g., as a weldment). Additionally or alternatively, the chassis may include a portion of the driveline 50. By way of example, a component of the driveline 50 (e.g., the transmission 52) may include a housing of sufficient thickness to provide the component with strength to support other components of the vehicle 10.

According to an exemplary embodiment, the vehicle 10 is an off-road machine or vehicle. In some embodiments, the off-road machine or vehicle is an agricultural machine or vehicle such as a tractor, a telehandler, a front loader, a combine harvester, a grape harvester, a forage harvester, a sprayer vehicle, a speedrower, and/or another type of agricultural machine or vehicle. In some embodiments, the off-road machine or vehicle is a construction machine or vehicle such as a skid steer loader, an excavator, a backhoe loader, a wheel loader, a bulldozer, a telehandler, a motor grader, and/or another type of construction machine or vehicle. In some embodiments, the vehicle 10 includes one or more attached implements and/or trailed implements such as a front mounted mower, a rear mounted mower, a trailed mower, a tedder, a rake, a baler, a plough, a cultivator, a rotavator, a tiller, a harvester, and/or another type of attached implement or trailed implement.

According to an exemplary embodiment, the cab 30 is configured to provide seating for an operator (e.g., a driver, etc.) of the vehicle 10. In some embodiments, the cab 30 is configured to provide seating for one or more passengers of the vehicle 10. According to an exemplary embodiment, the operator interface 40 is configured to provide an operator with the ability to control one or more functions of and/or provide commands to the vehicle 10 and the components thereof (e.g., turn on, turn off, drive, turn, brake, engage various operating modes, raise/lower an implement, etc.). The operator interface 40 may include one or more displays and one or more input devices. The one or more displays may be or include a touchscreen, a LCD display, a LED display, a speedometer, gauges, warning lights, etc. The one or more input device may be or include a steering wheel, a joystick, buttons, switches, knobs, levers, an accelerator pedal, a brake pedal, etc.

According to an exemplary embodiment, the driveline 50 is configured to propel the vehicle 10. As shown in FIG. 3, the driveline 50 includes a primary driver, shown as prime mover 52, and an energy storage device, shown as energy storage 54. In some embodiments, the driveline 50 is a conventional driveline whereby the prime mover 52 is an internal combustion engine and the energy storage 54 is a fuel tank. The internal combustion engine may be a spark-ignition internal combustion engine or a compression-ignition internal combustion engine that may use any suitable fuel type (e.g., diesel, ethanol, gasoline, natural gas, propane, etc.). In some embodiments, the driveline 50 is an electric driveline whereby the prime mover 52 is an electric motor and the energy storage 54 is a battery system. In some embodiments, the driveline 50 is a fuel cell electric driveline whereby the prime mover 52 is an electric motor and the energy storage 54 is a fuel cell (e.g., that stores hydrogen, that produces electricity from the hydrogen, etc.). In some embodiments, the driveline 50 is a hybrid driveline whereby (i) the prime mover 52 includes an internal combustion engine and an electric motor/generator and (ii) the energy storage 54 includes a fuel tank and/or a battery system.

As shown in FIG. 3, the driveline 50 includes a transmission device (e.g., a gearbox, a continuous variable transmission ("CVT"), etc.), shown as transmission 56, coupled to the prime mover 52; a power divider, shown as transfer case 58, coupled to the transmission 56; a first tractive assembly, shown as front tractive assembly 70, coupled to a first output of the transfer case 58, shown as front output 60; and a second tractive assembly, shown as rear tractive assembly 80, coupled to a second output of the transfer case 58, shown as rear output 62. According to an exemplary embodiment, the transmission 56 has a variety of configurations (e.g., gear ratios, etc.) and provides different output speeds relative to a mechanical input received thereby from the prime mover 52. In some embodiments (e.g., in electric driveline configurations, in hybrid driveline configurations, etc.), the driveline 50 does not include the transmission 56. In such embodiments, the prime mover 52 may be directly coupled to the transfer case 58. According to an exemplary embodiment, the transfer case 58 is configured to facilitate driving both the front tractive assembly 70 and the rear tractive assembly 80 with the prime mover 52 to facilitate front and rear drive (e.g., an all-wheel-drive vehicle, a four-wheel-drive vehicle, etc.). In some embodiments, the transfer case 58 facilitates selectively engaging rear drive only, front drive only, and both front and rear drive simultaneously. In some embodiments, the transmission 56 and/or the transfer case 58 facilitate selectively disengaging the front tractive assembly 70 and the rear tractive assembly 80 from the prime mover 52 (e.g., to permit free movement of the front tractive assembly 70 and the rear tractive assembly 80 in a neutral mode of operation). In some embodiments, the driveline 50 does not include the transfer case 58. In such embodiments, the prime mover 52 or the transmission 56 may directly drive the front tractive assembly 70 (i.e., a front-wheel-drive vehicle) or the rear tractive assembly 80 (i.e., a rear-wheel-drive vehicle).

As shown in FIGS. 1 and 3, the front tractive assembly 70 includes a first drive shaft, shown as front drive shaft 72, coupled to the front output 60 of the transfer case 58; a first differential, shown as front differential 74, coupled to the front drive shaft 72; a first axle, shown front axle 76, coupled to the front differential 74; and a first pair of tractive elements, shown as front tractive elements 78, coupled to the front axle 76. In some embodiments, the front tractive assembly 70 includes a plurality of front axles 76. In some embodiments, the front tractive assembly 70 does not include the front drive shaft 72 or the front differential 74 (e.g., a rear-wheel-drive vehicle). In some embodiments, the front drive shaft 72 is directly coupled to the transmission 56 (e.g., in a front-wheel-drive vehicle, in embodiments where the driveline 50 does not include the transfer case 58, etc.) or the prime mover 52 (e.g., in a front-wheel-drive vehicle, in embodiments where the driveline 50 does not include the transfer case 58 or the transmission 56, etc.). The front axle 76 may include one or more components.

As shown in FIGS. 1 and 3, the rear tractive assembly 80 includes a second drive shaft, shown as rear drive shaft 82, coupled to the rear output 62 of the transfer case 58; a second differential, shown as rear differential 84, coupled to the rear drive shaft 82; a second axle, shown rear axle 86, coupled to the rear differential 84; and a second pair of tractive elements, shown as rear tractive elements 88, coupled to the rear axle 86. In some embodiments, the rear tractive assembly 80 includes a plurality of rear axles 86. In some embodiments, the rear tractive assembly 80 does not include the rear drive shaft 82 or the rear differential 84 (e.g., a front-wheel-drive vehicle). In some embodiments, the rear drive shaft 82 is directly coupled to the transmission 56 (e.g., in a rear-wheel-drive vehicle, in embodiments where the driveline 50 does not include the transfer case 58, etc.) or the prime mover 52 (e.g., in a rear-wheel-drive vehicle, in embodiments where the driveline 50 does not include the transfer case 58 or the transmission 56, etc.). The rear axle 86 may include one or more components. According to the exemplary embodiment shown in FIG. 1, the front tractive elements 78 and the rear tractive elements 88 are structured as wheels. In other embodiments, the front tractive elements 78 and the rear tractive elements 88 are otherwise structured (e.g., tracks, etc.). In some embodiments, the front tractive elements 78 and the rear tractive elements 88 are both steerable. In other embodiments, only one of the front tractive elements 78 or the rear tractive elements 88 is steerable. In still other embodiments, both the front tractive elements 78 and the rear tractive elements 88 are fixed and not steerable.

In some embodiments, the driveline 50 includes a plurality of prime movers 52. By way of example, the driveline 50 may include a first prime mover 52 that drives the front tractive assembly 70 and a second prime mover 52 that drives the rear tractive assembly 80. By way of another example, the driveline 50 may include a first prime mover 52 that drives a first one of the front tractive elements 78, a second prime mover 52 that drives a second one of the front tractive elements 78, a third prime mover 52 that drives a first one of the rear tractive elements 88, and/or a fourth prime mover 52 that drives a second one of the rear tractive elements 88. By way of still another example, the driveline 50 may include a first prime mover that drives the front tractive assembly 70, a second prime mover 52 that drives a first one of the rear tractive elements 88, and a third prime mover 52 that drives a second one of the rear tractive elements 88. By way of yet another example, the driveline 50 may include a first prime mover that drives the rear tractive assembly 80, a second prime mover 52 that drives a first one of the front tractive elements 78, and a third prime mover 52 that drives a second one of the front tractive elements 78. In such embodiments, the driveline 50 may not include the transmission 56 or the transfer case 58.

As shown in FIG. 3, the driveline 50 includes a power-take-off ("PTO"), shown as PTO 90. While the PTO 90 is shown as being an output of the transmission 56, in other embodiments the PTO 90 may be an output of the prime mover 52, the transmission 56, and/or the transfer case 58. According to an exemplary embodiment, the PTO 90 is configured to facilitate driving an attached implement and/or a trailed implement of the vehicle 10. In some embodiments, the driveline 50 includes a PTO clutch positioned to selectively decouple the driveline 50 from the attached implement and/or the trailed implement of the vehicle 10 (e.g., so that the attached implement and/or the trailed implement is only operated when desired, etc.).

According to an exemplary embodiment, the braking system 92 includes one or more brakes (e.g., disc brakes, drum brakes, in-board brakes, axle brakes, etc.) positioned to facilitate selectively braking (i) one or more components of the driveline 50 and/or (ii) one or more components of a trailed implement. In some embodiments, the one or more brakes include (i) one or more front brakes positioned to facilitate braking one or more components of the front tractive assembly 70 and (ii) one or more rear brakes positioned to facilitate braking one or more components of the rear tractive assembly 80. In some embodiments, the one or more brakes include only the one or more front brakes. In some embodiments, the one or more brakes include only the one or more rear brakes. In some embodiments, the one or more front brakes include two front brakes, one positioned to facilitate braking each of the front tractive elements 78. In some embodiments, the one or more front brakes include at least one front brake positioned to facilitate braking the front axle 76. In some embodiments, the one or more rear brakes include two rear brakes, one positioned to facilitate braking each of the rear tractive elements 88. In some embodiments, the one or more rear brakes include at least one rear brake positioned to facilitate braking the rear axle 86. Accordingly, the braking system 92 may include one or more brakes to facilitate braking the front axle 76, the front tractive elements 78, the rear axle 86, and/or the rear tractive elements 88. In some embodiments, the one or more brakes additionally include one or more trailer brakes of a trailed implement attached to the vehicle 10. The trailer brakes are positioned to facilitate selectively braking one or more axles and/or one more tractive elements (e.g., wheels, etc.) of the trailed implement.

Cab System

Figure 4:
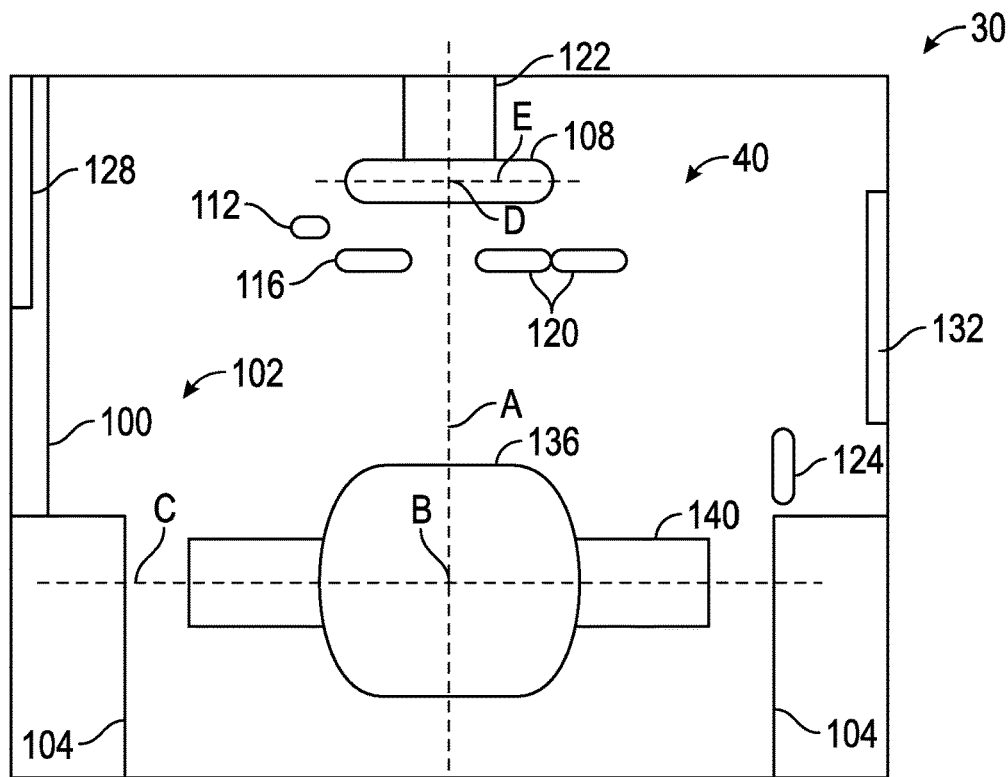
FIG. 4 is a schematic diagram of a cab system for the vehicle of FIG. 1 in a center position, according to an exemplary embodiment.

As shown in FIG. 4, the cab 30 of the vehicle 10 includes a door 100 for accessing a cab interior, a cab floor 102, and wheel wells 104. The door 100 is shown provided on a left hand side of the cab 30. In other embodiments, the door 100 is positioned on a right hand side of the cab 30. The cab 30 defines a cab center plane A that extends front to back and vertically through the cab 30 through a cab center point of the cab 30.

The cab 30 also includes the operator interface 40 including a steering column 108, a steering column release 112, a primary or steering column clutch pedal 116, and brake pedals 120 (e.g., a front brake pedal and a rear brake pedal). The steering column release 112 is positioned to the left of the steering column clutch pedal 116 relative to the center plane A. The steering column defines a steering column center point D at a point where a steering column horizontal axis E intersects the cab center plane A. In some embodiments, the steering column horizontal axis E is perpendicular to the cab center plane A and intersects a midpoint of the steering column (e.g., a center of a steering wheel). In some embodiments, the operator interface 40 includes a steering column slide actuator 122 structured to support the steering column 108 for movement in a direction transverse to the cab center plane A along the steering column horizontal axis E. The steering column 108 also defines a steering column center plane J that intersects the steering column center point D and is aligned transverse to the steering column horizontal axis E. In some embodiments, the steering column 108 is maintained in a static position and the steering column slide actuator 122 is eliminated.

The operator interface 40 also includes a secondary or remote clutch pedal 124 positioned remote of the steering column clutch pedal 116. In some embodiments, the remote clutch pedal 124 is positioned adjacent a right wheel well 104 of the cab 30. In some embodiments, the remote clutch pedal 124 is positioned adjacent a right wall of the cab 30. In some embodiments, the remote clutch pedal 124 is arranged perpendicular to the steering column clutch pedal 116. In some embodiments, the remote clutch pedal 124 is arranged at an oblique angle relative to the steering column clutch pedal 116. In some embodiments, the remote clutch pedal 124 interacts with the transmission 56 via a clutch-by-wire system (e.g., an electronically controlled clutch engagement/disengagement). In some embodiments, the remote clutch pedal 124 cooperates with the steering column clutch pedal 116 to provide a parallel clutch-by-wire system where both the steering column clutch 116 and the remote clutch 124 are actively controlling the transmission 56. In some embodiments, both the steering column clutch pedal 116 and the remote clutch pedal 124 provide a traditional clutch control for the transmission 56.

Figure 9:
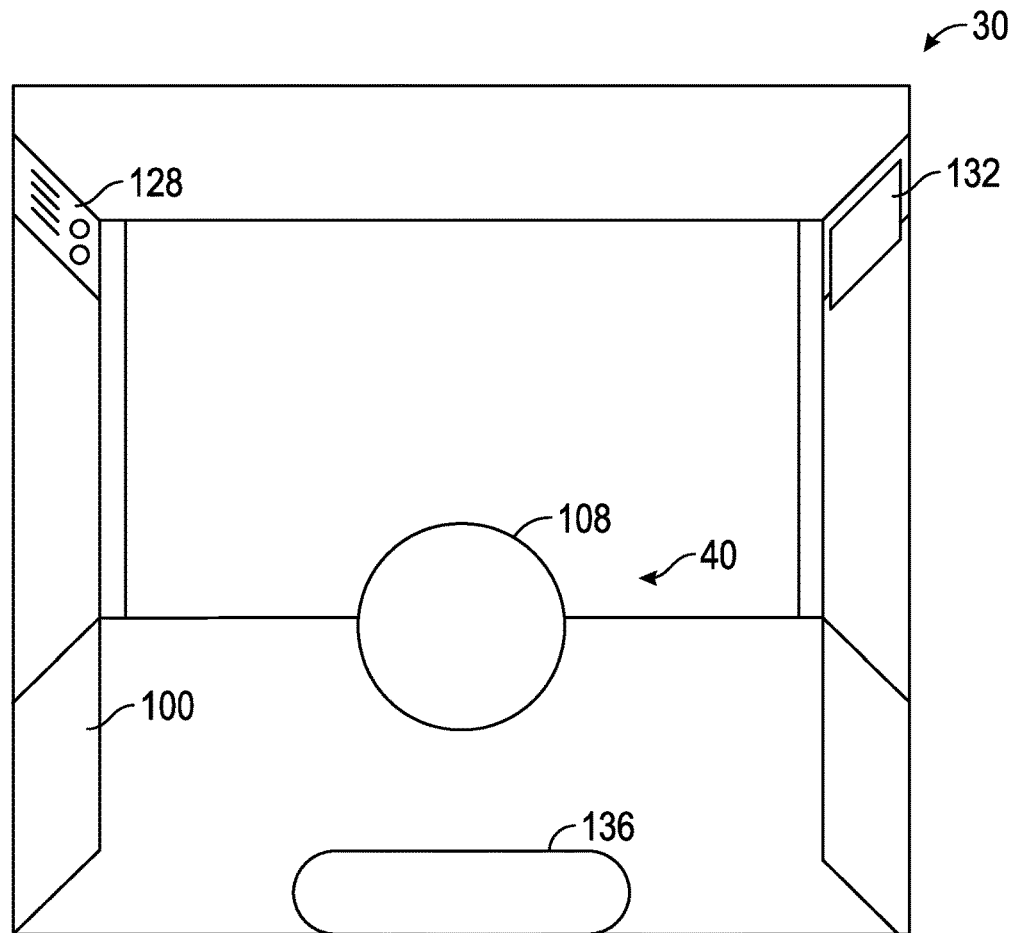
FIG. 9 is a schematic diagram of the cab system of FIG. 4 in a center position, according to an exemplary embodiment.

An HVAC and audio control panel 128 is provided above the door 100 on the left hand side of the cab 30 (see FIG. 9). Typically, these control panels are provided on the right hand side of the cab 30 above a right hand window. Positioning the control panel 128 above the door 100 frees valuable space on the right hand side of the cab 30. A visual display 132 is provided on the right hand side of the cab 30 and mounted toward a top portion of a right hand window. This provides the operator with a view of the visual display while viewing out the right hand window without impeding the field of view from the right hand window.

A seat 136 defines a seat center point B and is supported within the cab 30 by a seat slide actuator 140 that moves the seat 136 in a direction transverse to the cab center plane A along a seat slide axis C intersecting the seat center point B. A seat slide actuator 140 supports the seat 136 and provides selective movement of the seat 136 in a direction parallel to the cab center plane A. A seat height actuator 142 supports the seat 136 and provides selective movement of the seat 136 in a vertical direction (e.g., higher and lower). A seat rotation actuator 143 supports the seat 136 and provides rotation of the seat 136 relative to the cab center plane A.

In some embodiments, the control system 96 automatically controls actuation of the steering column slide actuator 122, the seat slide actuator 140, the seat spacing actuator 141, the seat height actuator 142, and the seat rotation actuator 143 (see FIG. 9). For example, the operator may be able to input preset programs into the operator interface 40 to automatically provide a desired seating and cab layout. In some embodiments, the cab system is arrangeable in a center position as shown in FIG. 4 where the seat 136 and the steering column 108 are aligned with the cab center plane A. The center position is most commonly used for driving the tractor forward or for travel. The operator can define a preset program for the center position that provide an ergonomic and comfortable body position to reduce fatigue over long hours of use. In some embodiments, as will be described with reference to FIGS. 5-8, the cab system is arrangeable in a side view position where one or more of the seat 136 and the steering column 108 moved laterally or rotated relative to the cab center plane A. The side view position is most commonly used for tilling or planting when the vehicle 10 is a tractor. The operator can define a preset program for the side view position that provide an ergonomic and comfortable body position to reduce fatigue over long hours of use.

Figure 5:
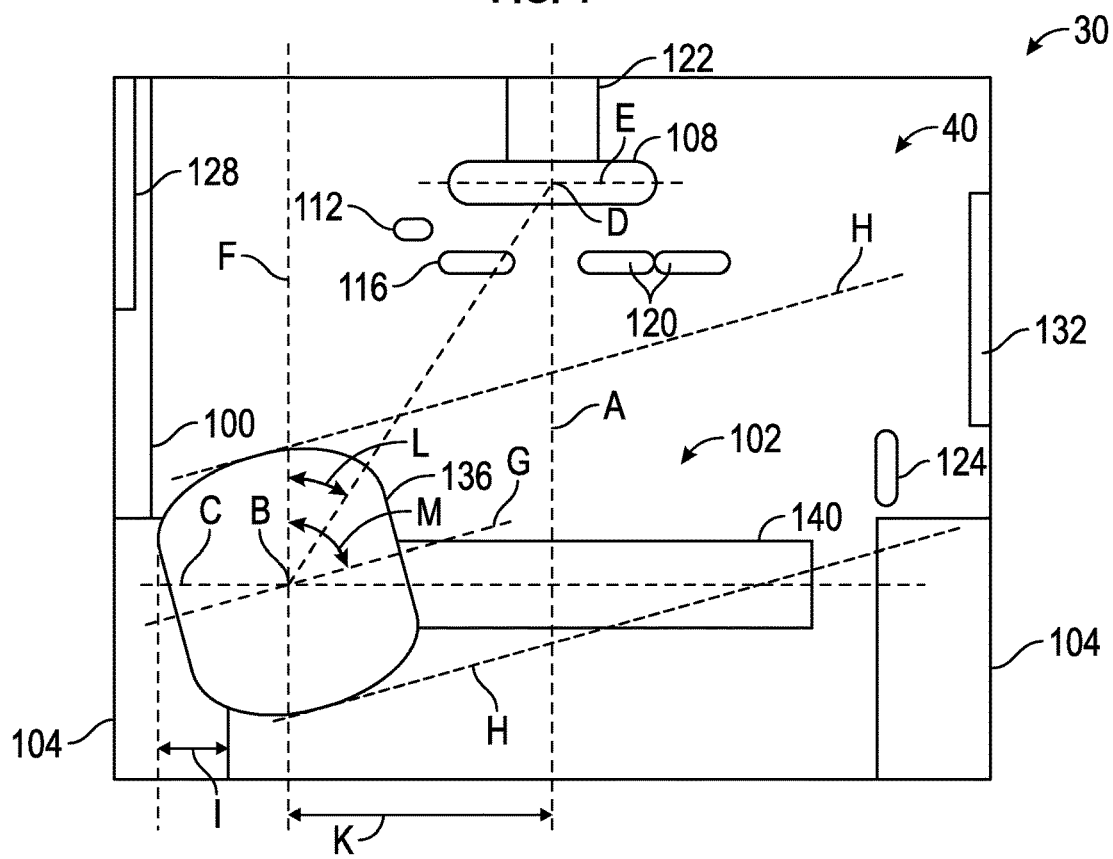
FIG. 5 is a schematic diagram of the cab system of FIG. 4 in a side view position, according to an exemplary embodiment.

As shown in FIG. 5, the side view position can include movement and rotation of the seat 136 while the steering column 108 remains stationary. The seat 136 is slide to the left (as shown in FIG. 5) to a seat offset plane F intersecting the seat center point B and parallel with the cab center plane A. The seat 136 further defines a seat center axis G projecting through the seat center point B through a center of a front of the seat 136. A projection volume H is defined parallel to the seat center axis G and bound by left and right sides of the seat 136. The projection volume H generally defines the area directly in front of the seat 136 and an area where the operator can comfortably operate. The remote clutch pedal 124 is positioned entirely within the projection volume H when the seat 136 is arranged in the side view position. In some embodiments, the projection volume H is entirely aligned with a side window of the cab 30 when the seat 136 is arranged in the side view position. In some embodiments, the projection volume His at least partially aligned with the visual display 132 when the seat 136 is arranged in the side view position.

While in the side view position depicted in FIG. 5, the seat 136 is elevated to a height above the left wheel well 104 by the seat height actuator 142. The elevation of the seat 136 allows the seat to define an overlap I where a portion of the seat 136 is vertically above the wheel well 104.

The seat 136 defines a seat offset K in the transverse direction between the seat center point B and the cab center plane A or alternatively, between the seat center point B and the steering column center plane J. In some embodiments, the seat offset is about zero inches in the center position. In some embodiments, the seat offset K is between about ten inches and about twenty-four inches in the side view position.

In some embodiments, a seat-steering angle L is defined between a center point of the seat and the steering column center point D is between about thirty degrees and about sixty degrees when the seat 136 is arranged in the side view position. In some embodiments, the seat rotation actuator 143 can provide a range of operator selectable seat-steering angles L so that the operator may select the seat-steering angle L as they desire.

The seat rotation actuator 143 is structured to rotate the seat 136 a seat rotation angle GM defined between the seat center axis G and the seat offset plane F. In some embodiments, the seat rotation angle M is between about forty-five degrees and about ninety degrees relative to the center plane. Again, the seat rotation angle M may be user selectable based on operator preferences.

Figure 6:
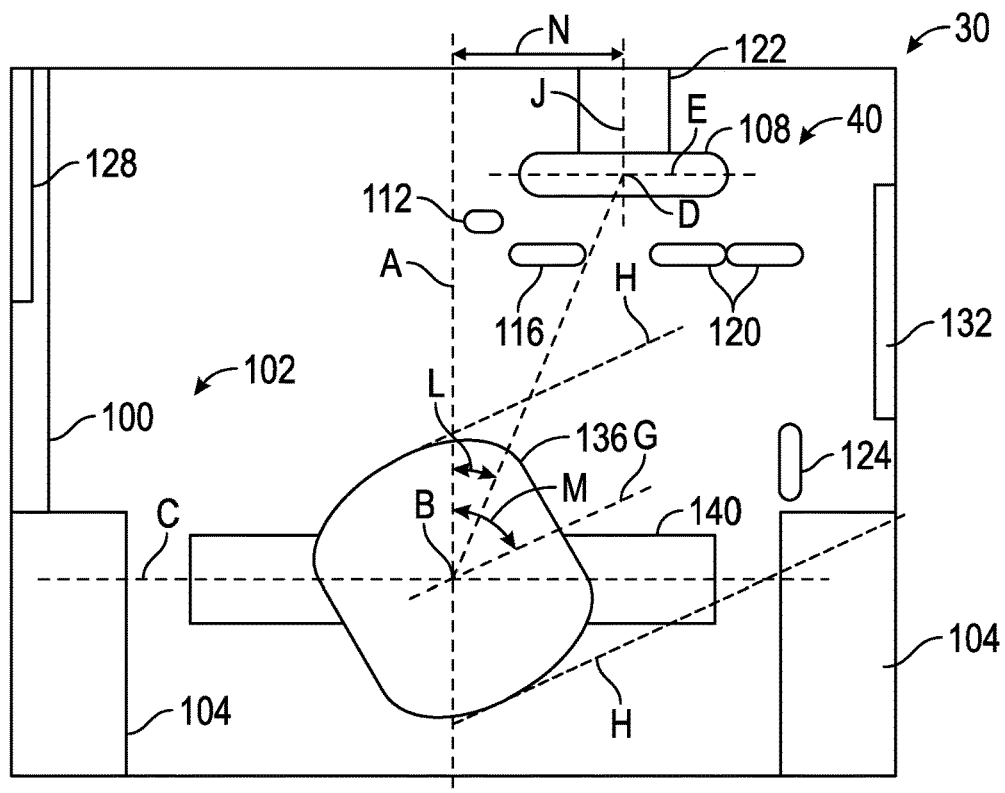
FIG. 6 is a schematic diagram of the cab system of FIG. 4 in another side view position, according to an exemplary embodiment.

As shown in FIG. 6, another possible side view position is achieved by moving the steering column slide actuator 122 in a direction transverse to the cab center plane A along the steering column horizontal axis E. A steering column offset N is provided between the steering column center plane J and the cab center plane A. In some embodiments, the center position defines a steering column offset N in the transverse direction between the seat center point B and the steering column center plane J of zero inches. In some embodiments, the side view position defines a steering column offset N in the transverse direction between the seat center point B and the steering column center plane J of between about ten inches and about twenty-four inches. In some embodiments, the steering column 108 and associated components provide a steer-by-wire or a control-by-wire system so that no hydraulic or mechanical connections from the steering column 108 are required to provide vehicle control (e.g., to transmission 56, braking system 92, etc.).

Figure 7:
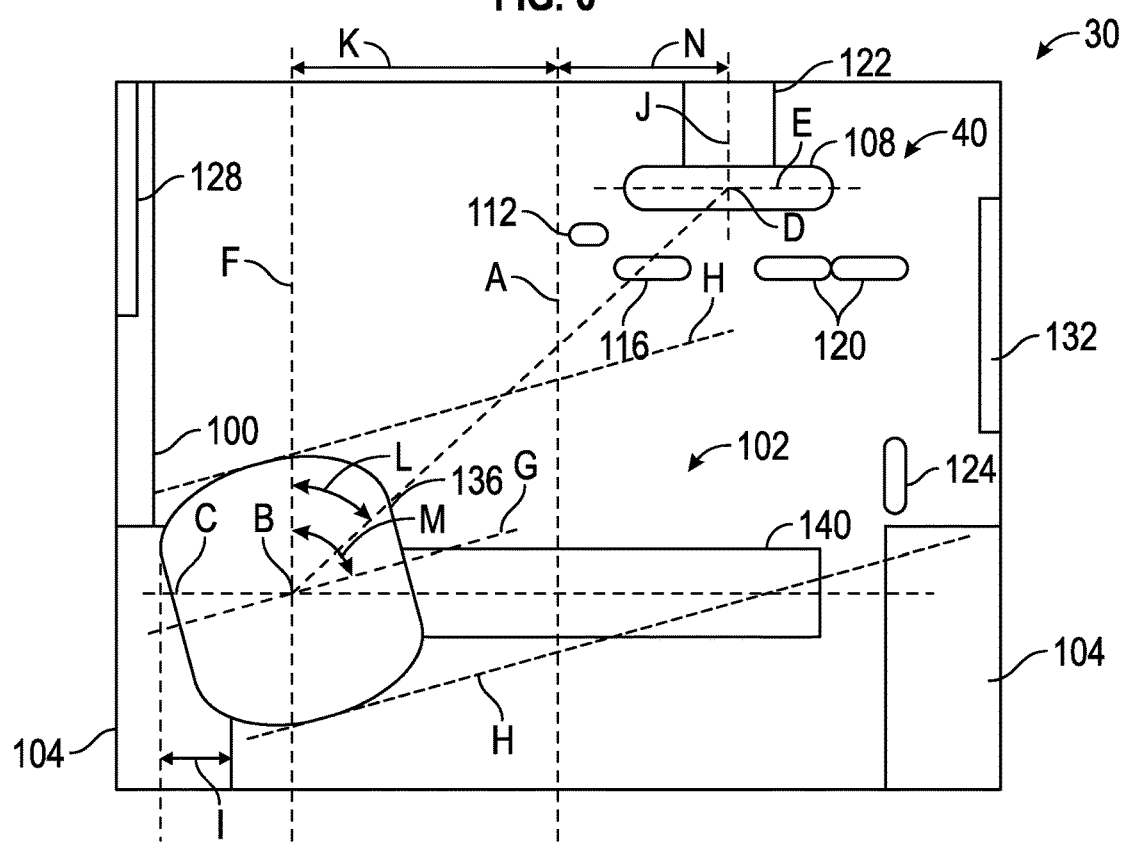
FIG. 7 is a schematic diagram of the cab system of FIG. 4 in another side view position, according to an exemplary embodiment.

As shown in FIG. 7, another possible side view position is achieved by moving both the steering column slide actuator 122 in a direction transverse to the cab center plane A along the steering column horizontal axis E and movement of along the seat slide axis C and rotation about the seat center point B of the seat 136. In some embodiments, the center position defines a summation of the steering column offset N and the seat offset K in the transverse direction between the seat center point B and the steering column center plane J of about zero inches. In some embodiments, the side view position defines a summation of the steering column offset N and the seat offset K in the transverse direction between the seat center point B and the steering column center plane J of between about ten inches and about twenty-four inches.

In some embodiments, the steering column 108 may swing in an arcuate pathway relative to the seat center point B so that a distance between the seat center point B and the steering column 108 can be maintained consistently with movement between the center position and the side view position.

Figure 8:
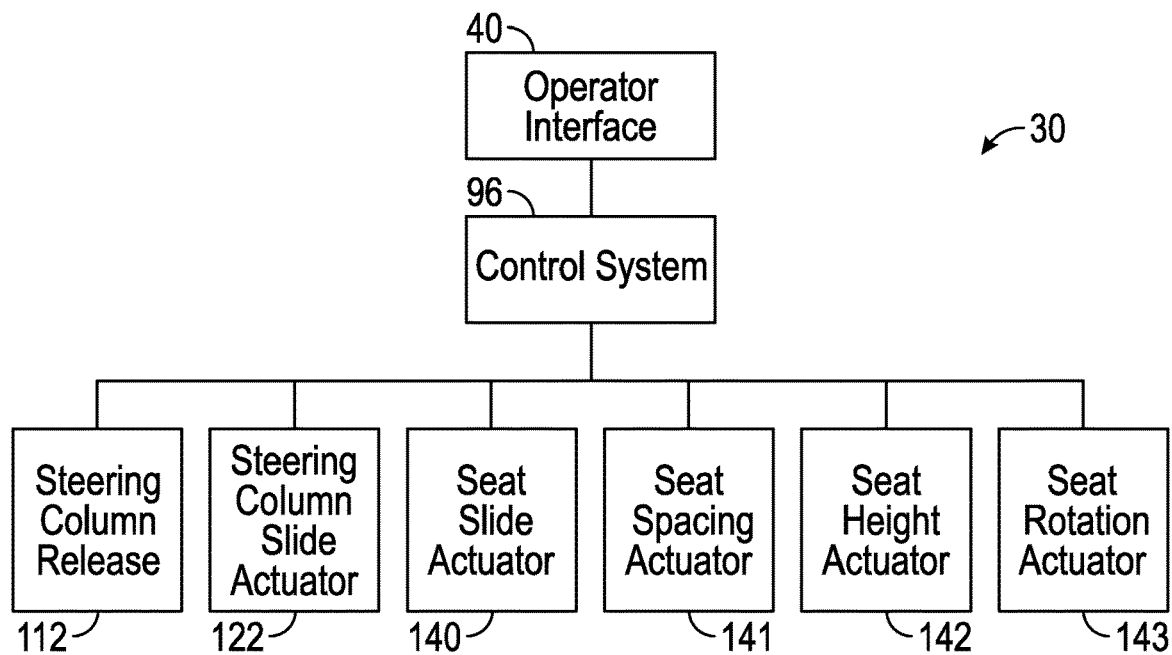
FIG. 8 is a schematic diagram of a control system of the cab system of FIG. 4, according to an exemplary embodiment.

As shown in FIG. 8, the control system 96 can control operation of one or more of the steering column release 112, the steering column slide actuator 122, the seat slide actuator 140, the seat spacing actuator 141, the seat height actuator 142, and the seat rotation actuator 143. The use of the control system 96 can allow for automated coordination of seat 136 and steering column 108 positioning. In some embodiments, the one or more of the steering column release 112, the steering column slide actuator 122, the seat slide actuator 140, the seat spacing actuator 141, the seat height actuator 142, and the seat rotation actuator 143 include motorized actuators (e.g., ball screws, stepper motors, servo motors, etc.) that are controlled via the control system 96. In some embodiments, one or more of the steering column release 112, the steering column slide actuator 122, the seat slide actuator 140, the seat spacing actuator 141, the seat height actuator 142, and the seat rotation actuator 143 include manual actuators that are manually manipulated by the operator to make the desired movements.

As utilized herein with respect to numerical ranges, the terms "approximately," "about," "substantially," and similar terms generally mean+/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The hardware and data processing components used to implement the various processes, operations, illustrative logics, logical blocks, modules, and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof (e.g., the driveline 50, the braking system 92, the control system 96, etc.) as shown in the various exemplary embodiments is illustrative only. Additionally, any element disclosed in one embodiment may be incorporated or utilized with any other embodiment disclosed herein.

What is claimed is:

1. A cab system for a vehicle, comprising:
a cab floor defining a center plane;
a seat supported by cab floor;
a steering column slide actuator coupled to the cab floor and selectively moveable relative to the seat; and
a steering column coupled to the steering column slide actuator, the steering column including a steering column release pedal, a clutch pedal, a front brake pedal, and a rear brake pedal.

2. The cab system of claim 1, wherein the steering column slide actuator is structured to move the steering column in a direction transverse to the center plane.

3. The cab system of claim 2, wherein the steering column slide actuator is structured to move the steering column in the direction transverse to the center plane between a center position and a side view position.

4. The cab system of claim 2, wherein the steering column slide actuator includes a motorized actuator.

5. The cab system of claim 4, wherein the motorized actuator is controlled automatically based on a preset program.

6. The cab system of claim 2, wherein:
the seat defines a seat center point;
the steering column defines a steering column center plane; and
the steering column slide actuator is structured to move the steering column in the direction transverse to the center plane between:
a center position defining an offset in the transverse direction between the seat center point and the steering column center plane of zero inches, and
a side view position defining an offset in the transverse direction between the seat center point and the steering column center plane of between about ten inches and about twenty-four inches.

7. The cab system of claim 2, wherein:
the seat defines a seat center point;
the steering column defines a steering column center point; and
the steering column slide actuator is structured to move the steering column in the direction transverse to the center plane between:
a center position defining a seat-steering angle of zero degrees defined between the seat center point and the steering column center point, and
a side view position defining a seat-steering angle of between about thirty and about sixty degrees defined between the seat center point and the steering column center point.

8. The cab system of claim 1, wherein the steering column defines a steering column center plane, and wherein the steering column slide actuator is structured to move the steering column in the direction transverse to the center plane between:
a center position defining an offset in the transverse direction between the center plane and the steering column center plane of zero inches, and
a side view position defining an offset in the transverse direction between the center plane and the steering column center plane of between about ten inches and about twenty-four inches.

9. The cab system of claim 1, further comprising a seat rotation actuator coupled to the cab floor and supporting the seat, the seat rotation actuator structured to rotate the seat between a center position and a side view position.

10. The cab system of claim 9, wherein the seat rotation actuator is structured to rotate the seat between about forty-five degrees and about ninety degrees relative to the center plane.

11. The cab system of claim 10, further comprising a seat slide actuator coupled to the cab floor and selectively moveable in a direction transverse to the center plane relative to the cab floor.

12. The cab system of claim 11, further comprising a seat height actuator supported by the seat slide actuator and supporting the seat, the seat height actuator structured to move the seat vertically above a wheel well when the seat is arranged in the side view position.

13. A cab system for a vehicle, comprising:
a cab defining a center plane;
a steering column slide actuator mounted in the cab and selectively moveable in a direction transverse to the center plane between a center position and a side view position;
a steering column coupled to the steering column slide actuator, the steering column including a first clutch pedal; and
a second clutch pedal positioned separate from the steering column.

14. The cab system of claim 13, wherein the center position defines an offset in the transverse direction between the center plane and a steering column center plane of zero inches, and wherein the side view position defines an offset in the transverse direction between the center plane and the steering column center plane of between about ten inches and about twenty-four inches.

15. The cab system of claim 13, further comprising a seat positioned in the cab and defining a seat center point, wherein the center position defines a seat-steering angle of zero degrees defined between the seat center point and a steering column center point, and wherein the side view position defines a seat-steering angle of between about thirty and about sixty degrees defined between the seat center point and the steering column center point.

16. The cab system of claim 13, further comprising:
a seat slide actuator mounted to the cab and selectively moveable in a direction transverse to the center plane; and
a seat rotation actuator supported by the seat slide actuator, and structured to rotate a seat supported thereby between about forty-five degrees and about ninety degrees relative to the center plane such that in a first rotational orientation the seat aligns with the first clutch pedal and in a second rotational orientation the seat aligns with the second clutch pedal.

17. The cab system of claim 13, wherein the steering column includes a brake pedal.

18. A cab system for a vehicle, comprising:
a cab;
a seat actuator mounted in the cab;
a seat coupled to the seat actuator;
a steering column actuator mounted in the cab;
a steering column coupled to the steering column actuator, the steering column including at least one of a steering column release, a first clutch pedal, or a brake pedal; and
a second clutch pedal positioned separate from the steering column;
wherein the seat actuator and the steering column actuator facilitate repositioning the seat and the steering column, respectively, from (a) a first orientation where (i) the steering column is positioned along a central plane of the cab and (ii) the seat is facing toward the steering column and facing away from the second clutch pedal to (b) a second orientation where (i) the steering column is offset from the central plane and (ii) the seat is facing toward the second clutch pedal.

* * * * *